United States Patent [19]
Machat et al.

[11] Patent Number: 5,295,663
[45] Date of Patent: Mar. 22, 1994

[54] PRESSURE CONTROL VALVE

[75] Inventors: Götz-Dieter Machat; Eugen Ebert; Hans Wölfges, all of Lohr, Fed. Rep. of Germany

[73] Assignee: Mannesmann Rexroth GmbH, Lohr, Fed. Rep. of Germany

[21] Appl. No.: 996,487

[22] Filed: Dec. 28, 1992

Related U.S. Application Data

[63] Continuation of Ser. No. 654,655, Feb. 7, 1991, abandoned.

[30] Foreign Application Priority Data

Apr. 7, 1989 [DE] Fed. Rep. of Germany ....... 3911426

[51] Int. Cl.$^5$ .............................................. F16K 17/10
[52] U.S. Cl. .................................. 251/333; 137/489; 137/491
[58] Field of Search ................ 137/489, 491; 251/333

[56] References Cited

FOREIGN PATENT DOCUMENTS

| | | |
|---|---|---|
| 2164736 | 8/1972 | Fed. Rep. of Germany . |
| 2848208 | 2/1980 | Fed. Rep. of Germany . |
| 3239931 | 5/1984 | Fed. Rep. of Germany ...... 137/491 |
| 3318246 | 11/1984 | Fed. Rep. of Germany . |
| 3824089 | 11/1989 | Fed. Rep. of Germany . |
| 990038 | 4/1965 | United Kingdom ................ 137/489 |

*Primary Examiner*—Gerald A. Michalsky
*Attorney, Agent, or Firm*—Cushman, Darby & Cushman

[57] ABSTRACT

A pressure control valve is provided comprising an inlet bore, an annular channel and a control spool. So as to obtain a low control deviation and good stability an annular channel is provided at the outlet side of the valve. The axial extension of said annular channel is smaller than the outlet flow area formed by said bores.

22 Claims, 12 Drawing Sheets

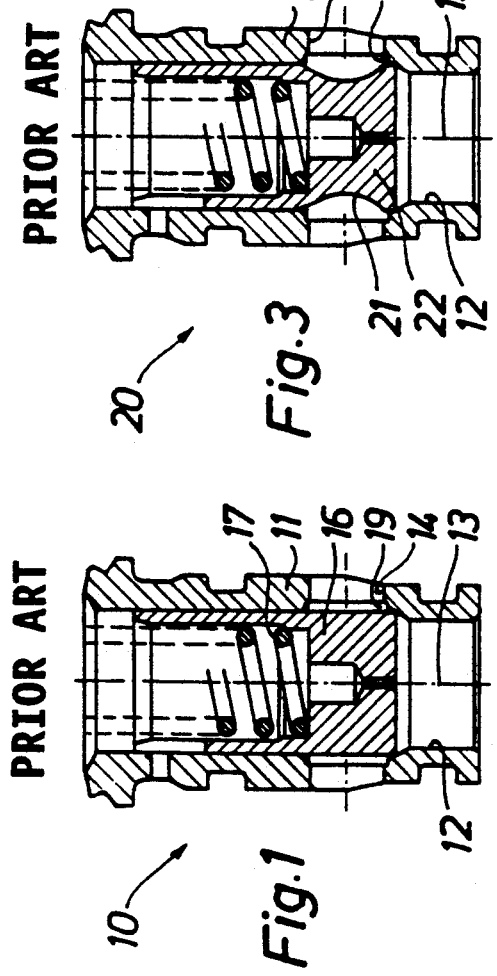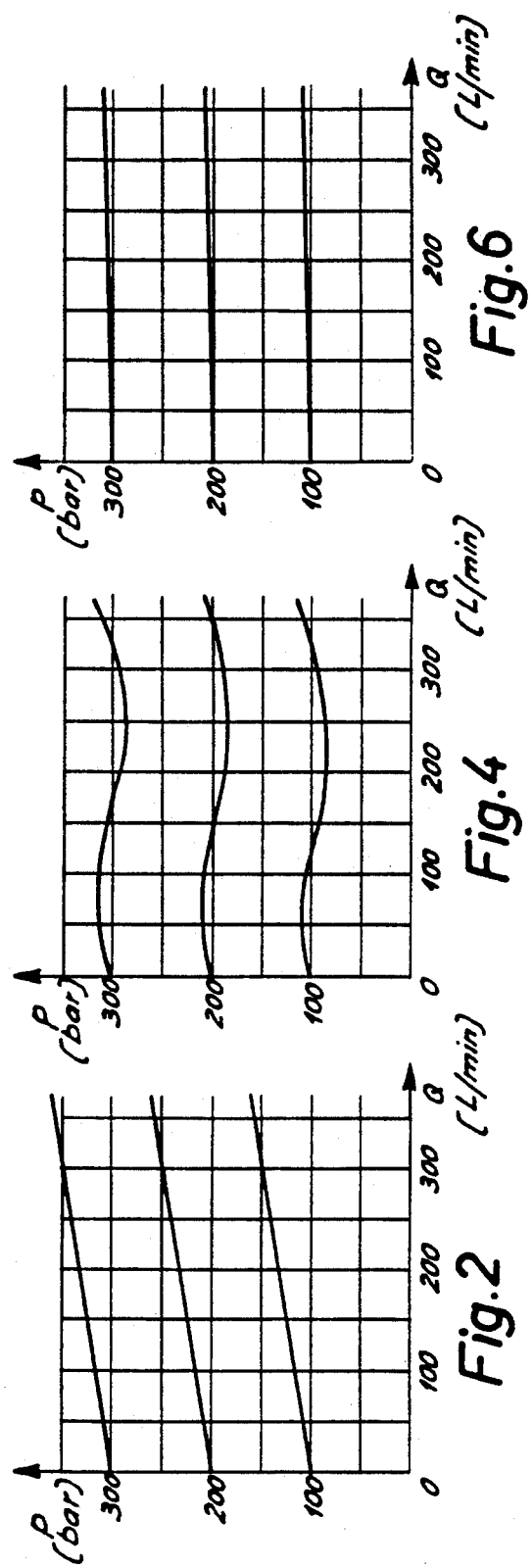

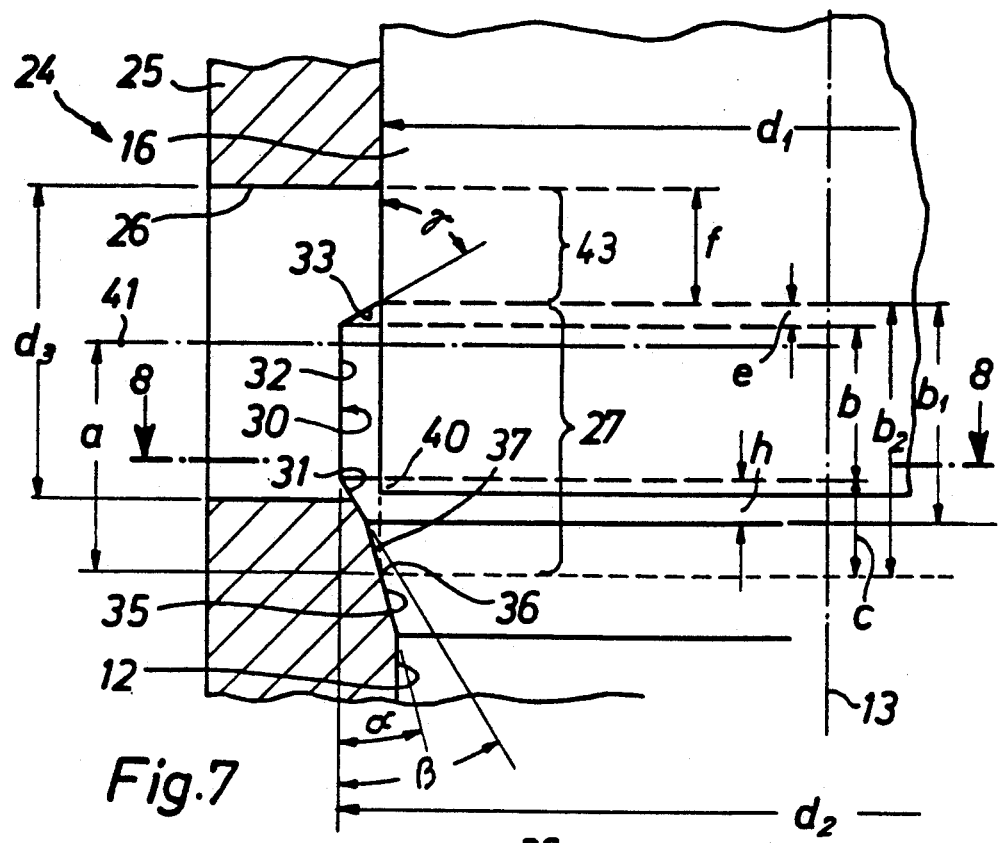
Fig.7
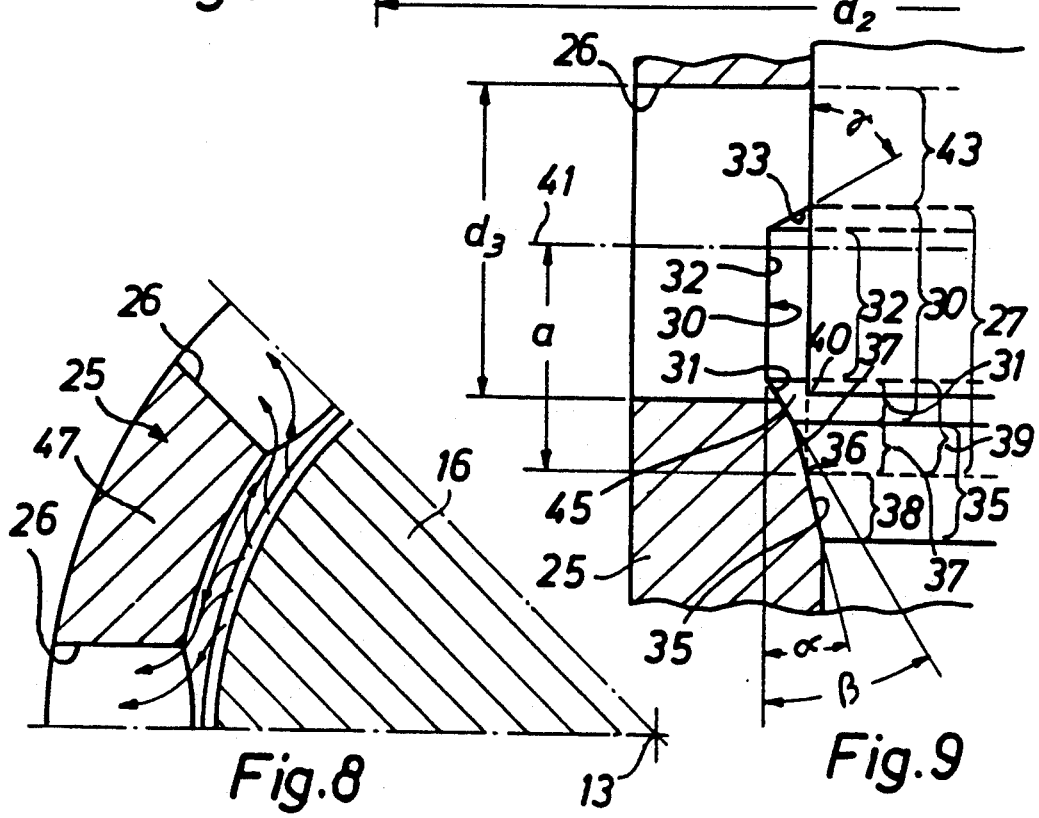
Fig.8
Fig.9

PRESSURE CONTROL VALVE

This is a continuation of application Ser. No. 07/654,655, filed on Feb. 7, 1991, which was abandoned upon the filling hereof.

The present invention relates to a pressure control valve, and in particular to a pilot controlled pressure relief valve and a sequence valve.

Particularly, the present invention relates to a pressure relief valve. Valves of this type are known, generally and will be discussed below in connection with FIG. 1 to 4.

For a known valve used in a main stage (main valve) having the traditional annular channel, very high control deviations occur. For a known main valve having a concave spool surface a compensation of the flow force is achieved by providing a recess by means of machining in the surface of the main spool in the area of the inner annular flow outlet channel between sleeve and spool (see also FIG. 3 and 4). The laterally located recess creates an attack surface at the spool for the jet of pressure medium which is diverted behind the control cross section. The effect of the impact of the jet of flowing pressure medium (liquid) and the stagnation pressure occuring within the inner outlet flow channel, which will act upon the spool on an attack surface which varies with the stroke, can lead in certain areas even to an overcompensation of the flow force such that decreasing characteristics result in certain areas of the flow volume. The additional force in the direction of opening causes an additional stroke or movement, which would not occur under the same conditions for a spool without the lateral recess at the cylindrical surface of the spool. Said additional movement reduces the control deviation of said known valve. However, a large disadvantage of the lateral recess of the spool resides in the fact that the additional force acting the direction of opening and created by the stagnation pressure in the outlet area is dependent on the movement and the volume flow, respectively. The consequence thereof is that the characteristic lines are "S"-shaped. Another disadvantage is the lack of being able to precisely manufacture repeatedly the concave profile of the outer surface, so that valves from different manufacturing batches will have deviating characteristics.

It is an object of the present invention to provide a pressure control valve such that the disadvantages of the prior art are overcome. It is a particular object of the present invention to design the pressure control valve such that the control deviation of the valve is low in the entire range of volumes for the respective nominal valve size, while at the same time good stability is achieved. In accordance with the invention this is done by an effective compensation of the axial component of the flow force in the outlet area of the valve sleeve.

Futher, it is intended to be able to repeatedly manufacture the pressure control valve with good precision of said valve. Moreover, a favorable behaviour of the valve with regard to noise is an object. As a solution, the present invention provides for a pressure control valve including a sleeve, an inlet flow bore, axially extending in said sleeve, a plurality of outlet flow bores radially extending in said sleeve, a spool having a constant outer diameter, axially reciprocally mounted in said sleeve, acting as a control (or closing) element, said spool having a spool edge adapted to be moved through a control range, an annular channel provided in said sleeve between said inlet flow bore and said outlet flow bores, said annular channel having a width and a diameter, said diameter being larger than the diameter of said inlet flow bore, a stepless transition area provided in said control range within said sleeve between the inlet flow bore and a starting inclination of the annular channel, said outlet flow bores form top ends and, opposite thereto, bottom ends and are arranged across a part of said annular channel such that a zone remains which is free of the annular channel, and wherein the bottom ends are located in the area of said starting inclination.

Further advantages, objects and details of the invention can be gathered from the description of embodiments; in the drawings:

FIG. 1 shows a prior art main valve of a pilot control pressure relief valve having a traditional annular channel;

FIG. 2 shows the control characteristics for the valve of FIG. 1;

FIG. 3 shows another prior art main valve having a concave outer spool surface for a pilot controlled pressure relief valve (for instance, DB 20K series 4x);

Figure 10:
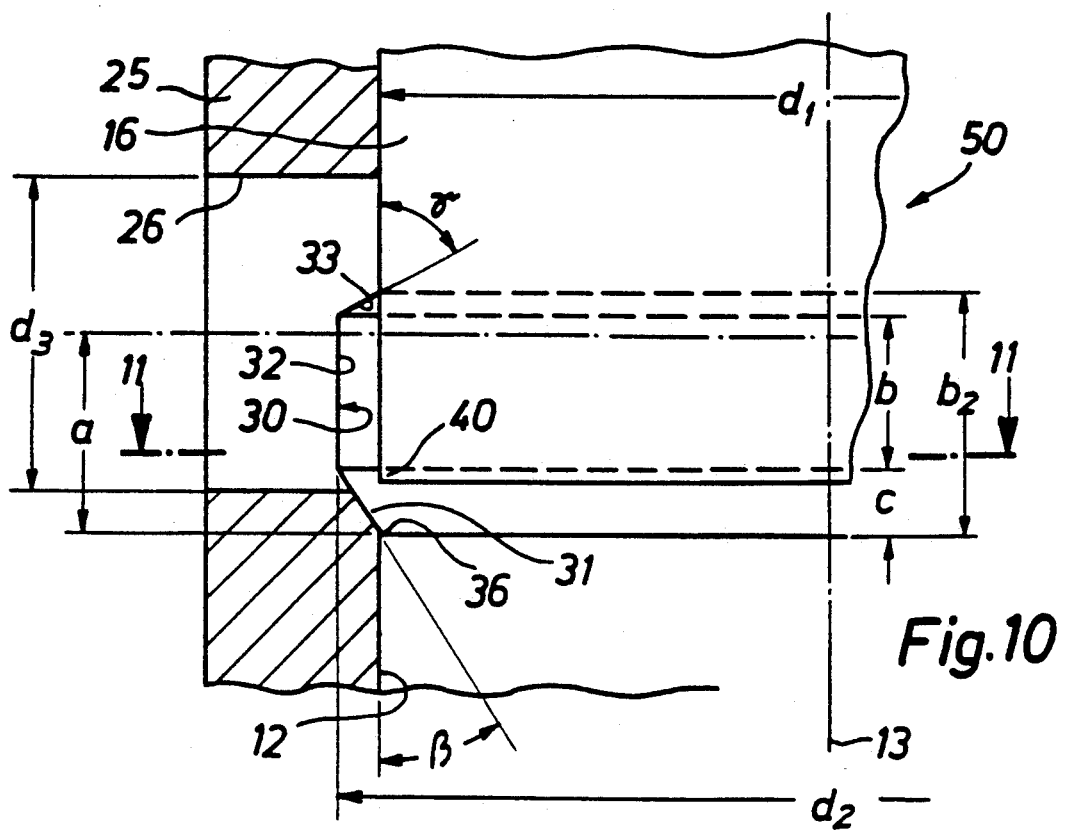
Figure 11:
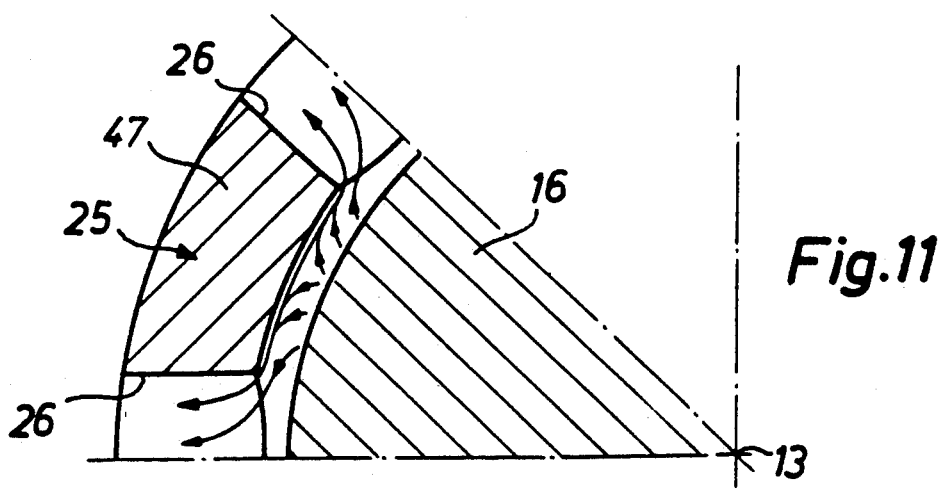
Figure 12:
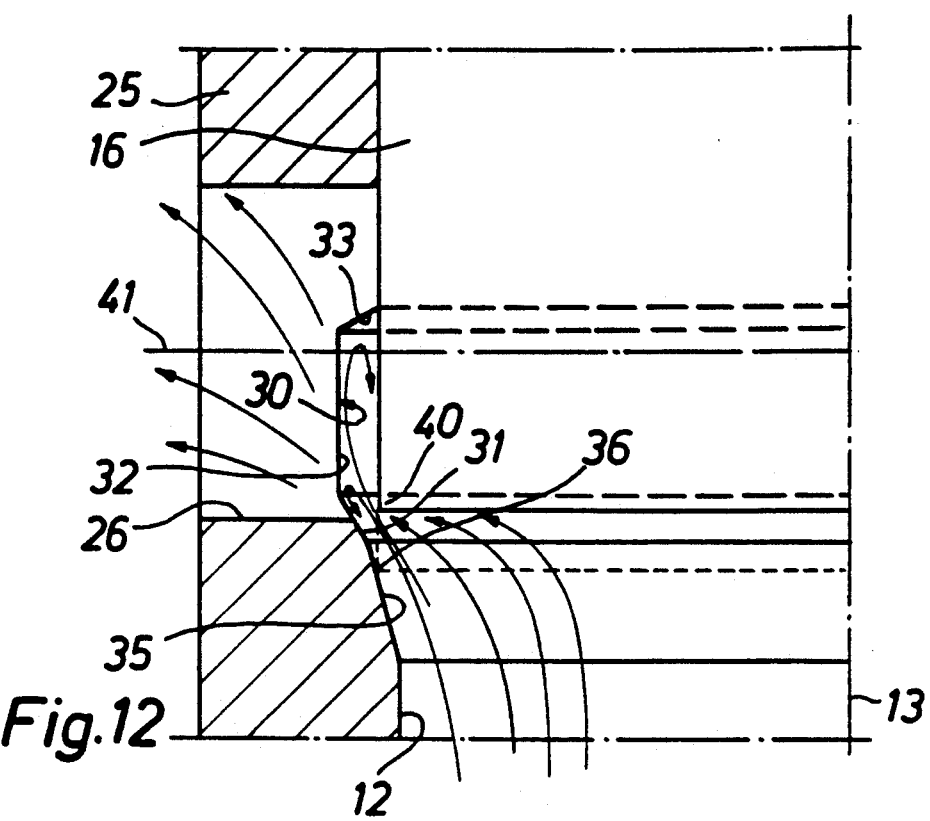
Figure 13:
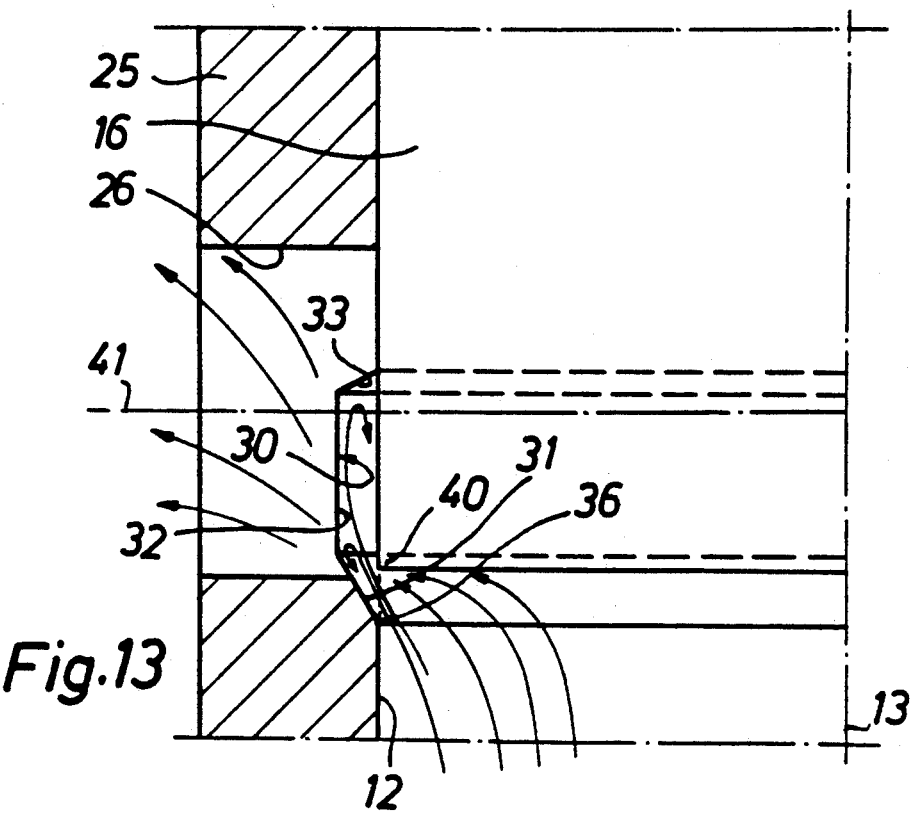
Figure 14:
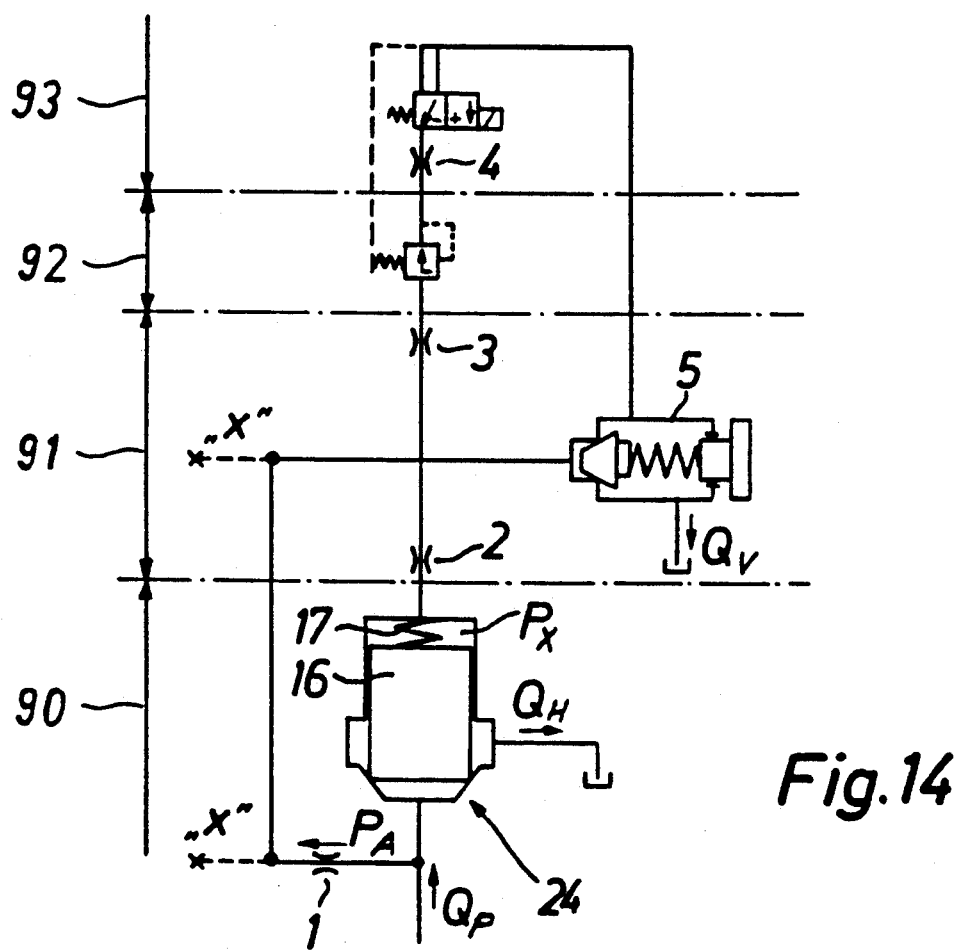
Figure 15:
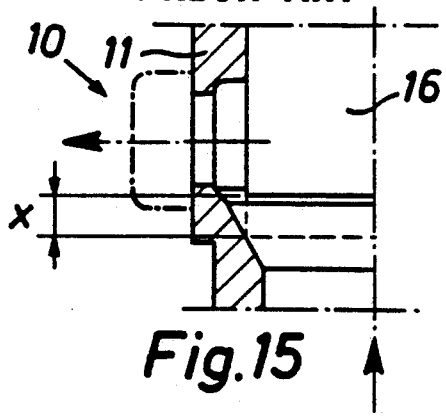
Figure 16:
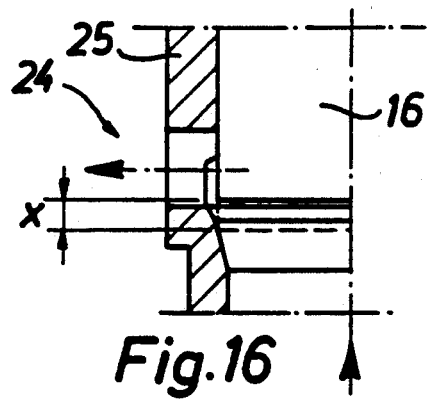
Figure 17:
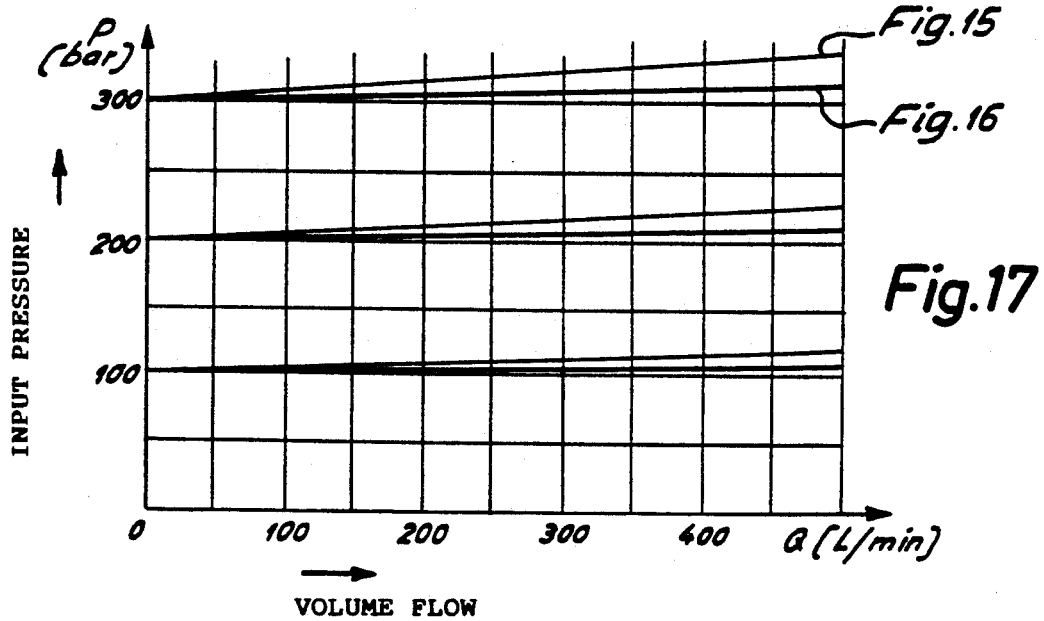
Figure 18:
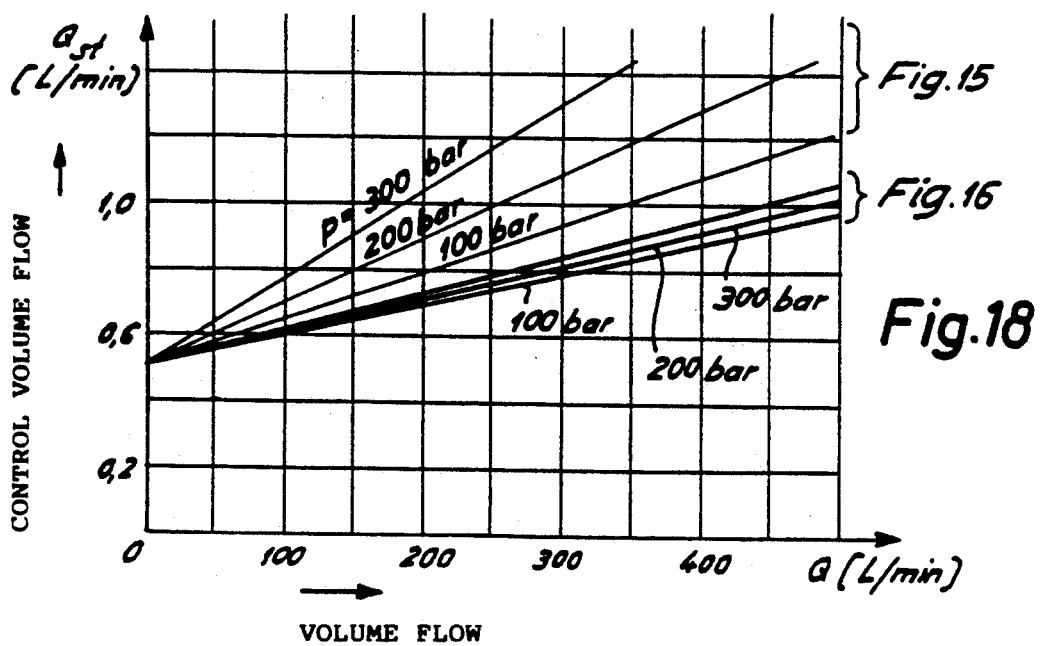
Figure 19:
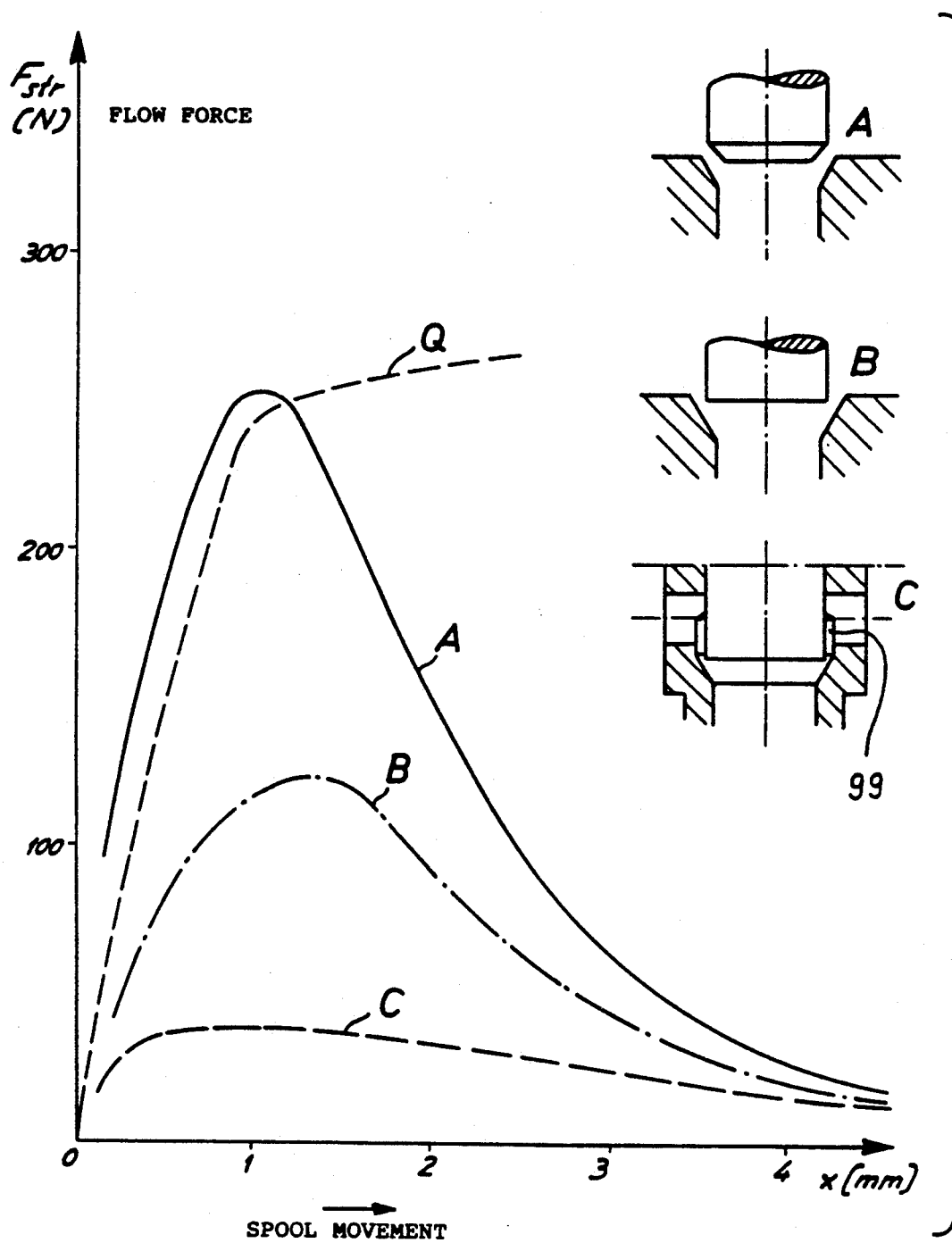
Figure 20:
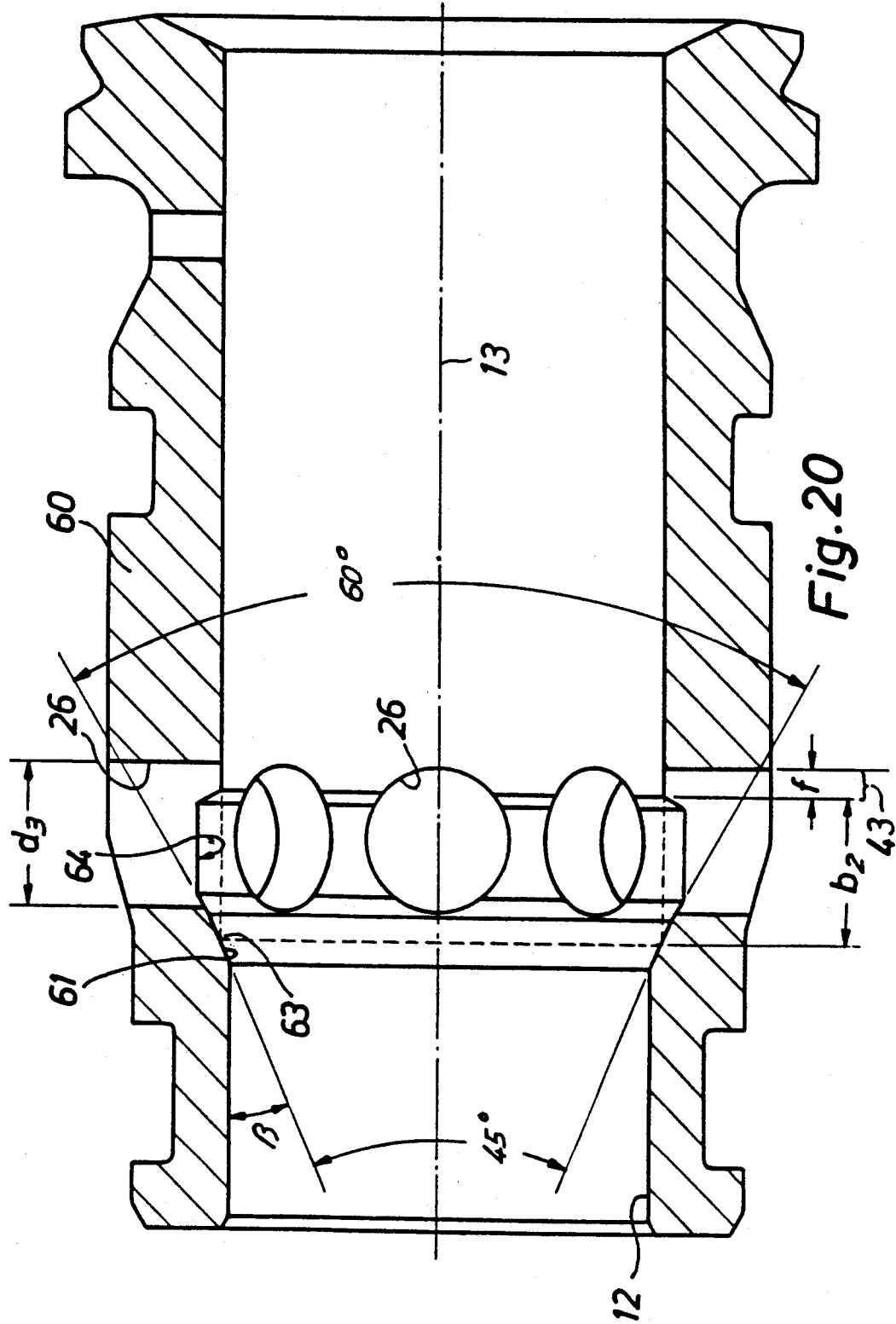
Figure 21:
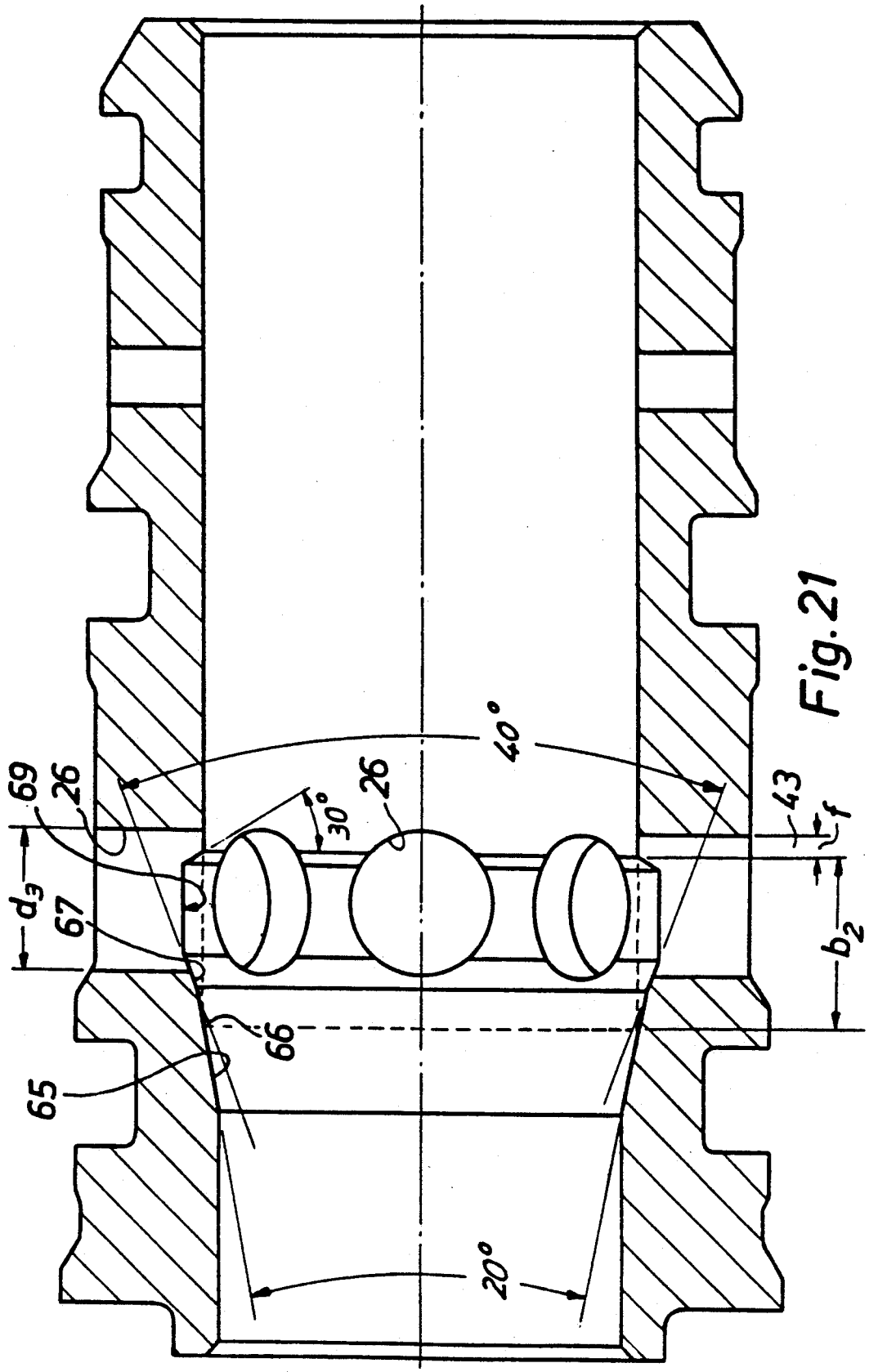
Figure 22:
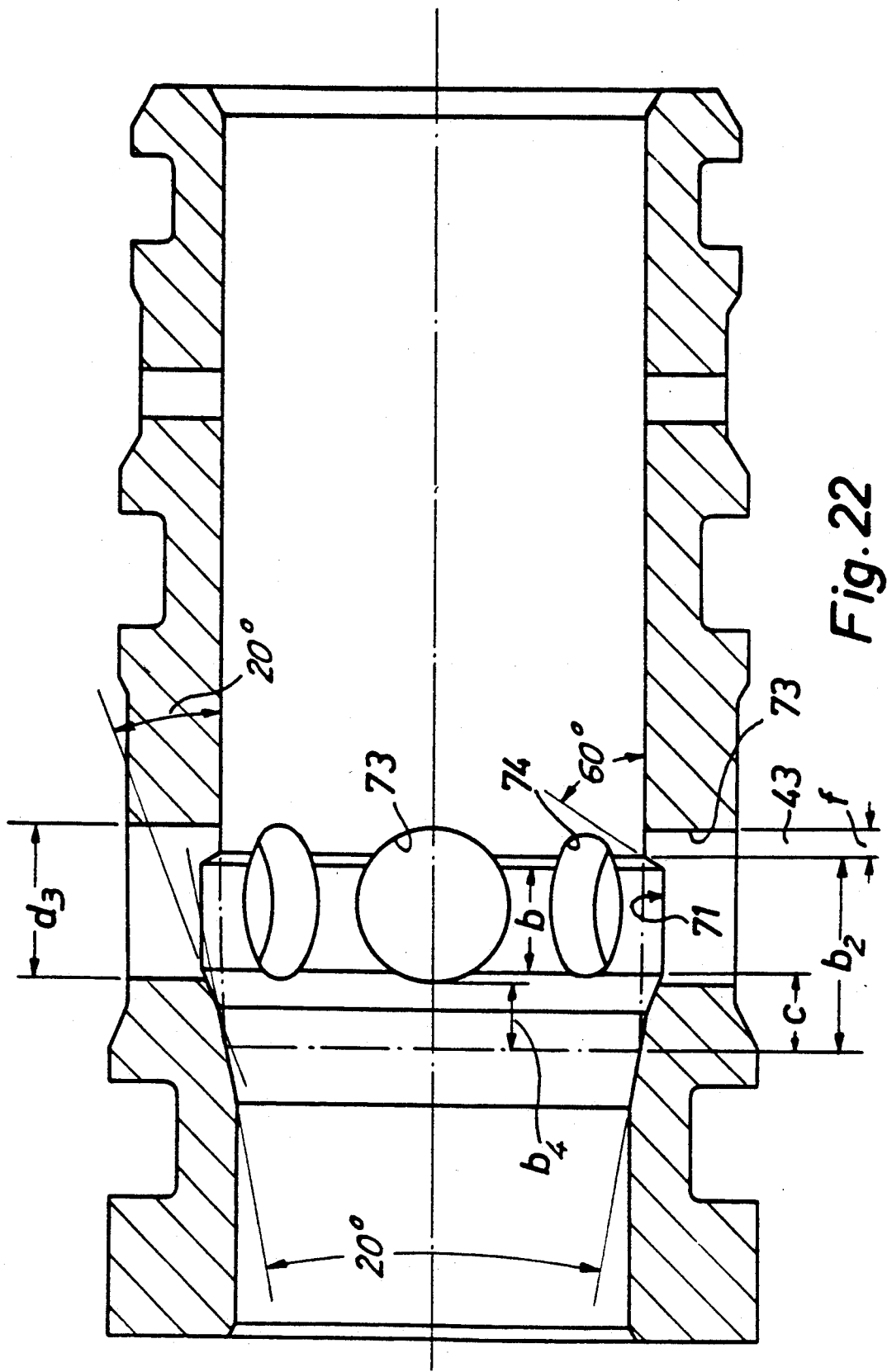
Figure 23:
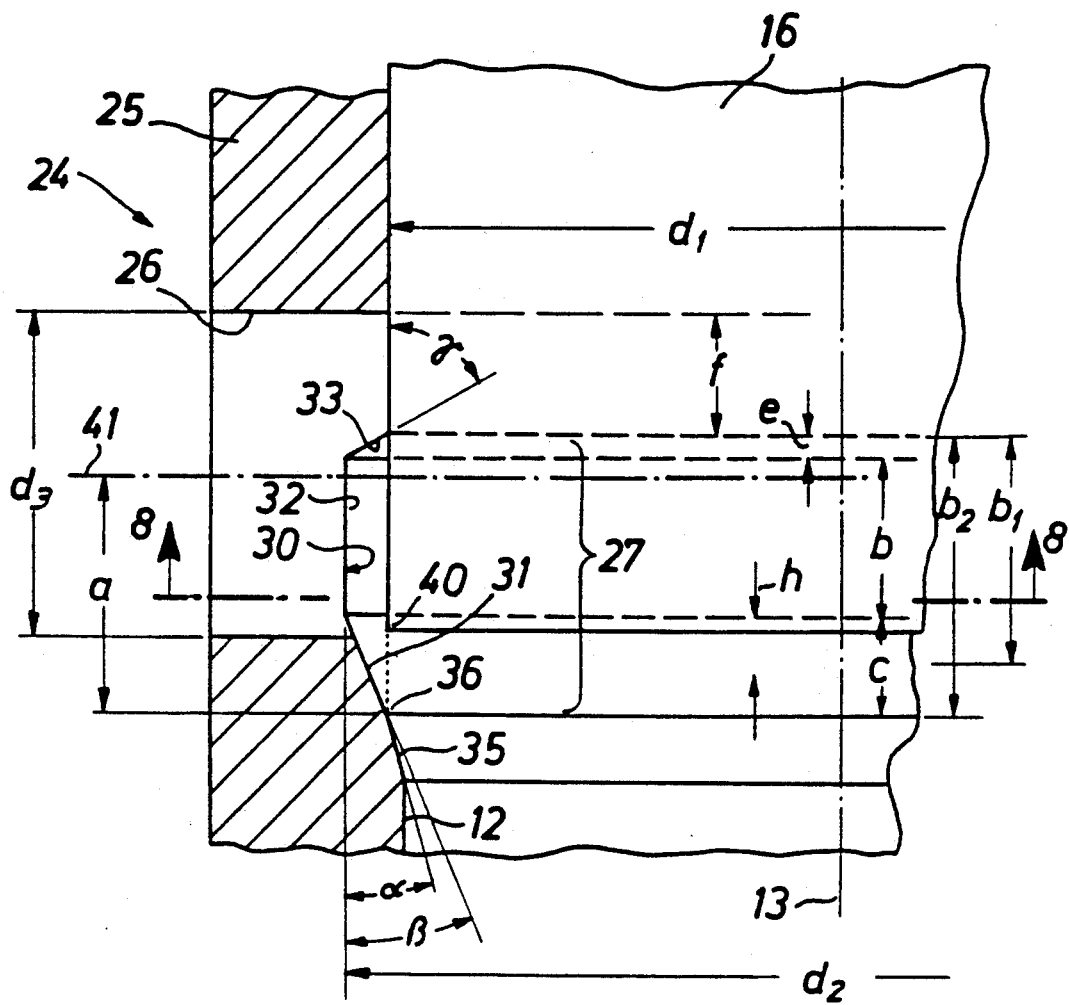
Figure 24:
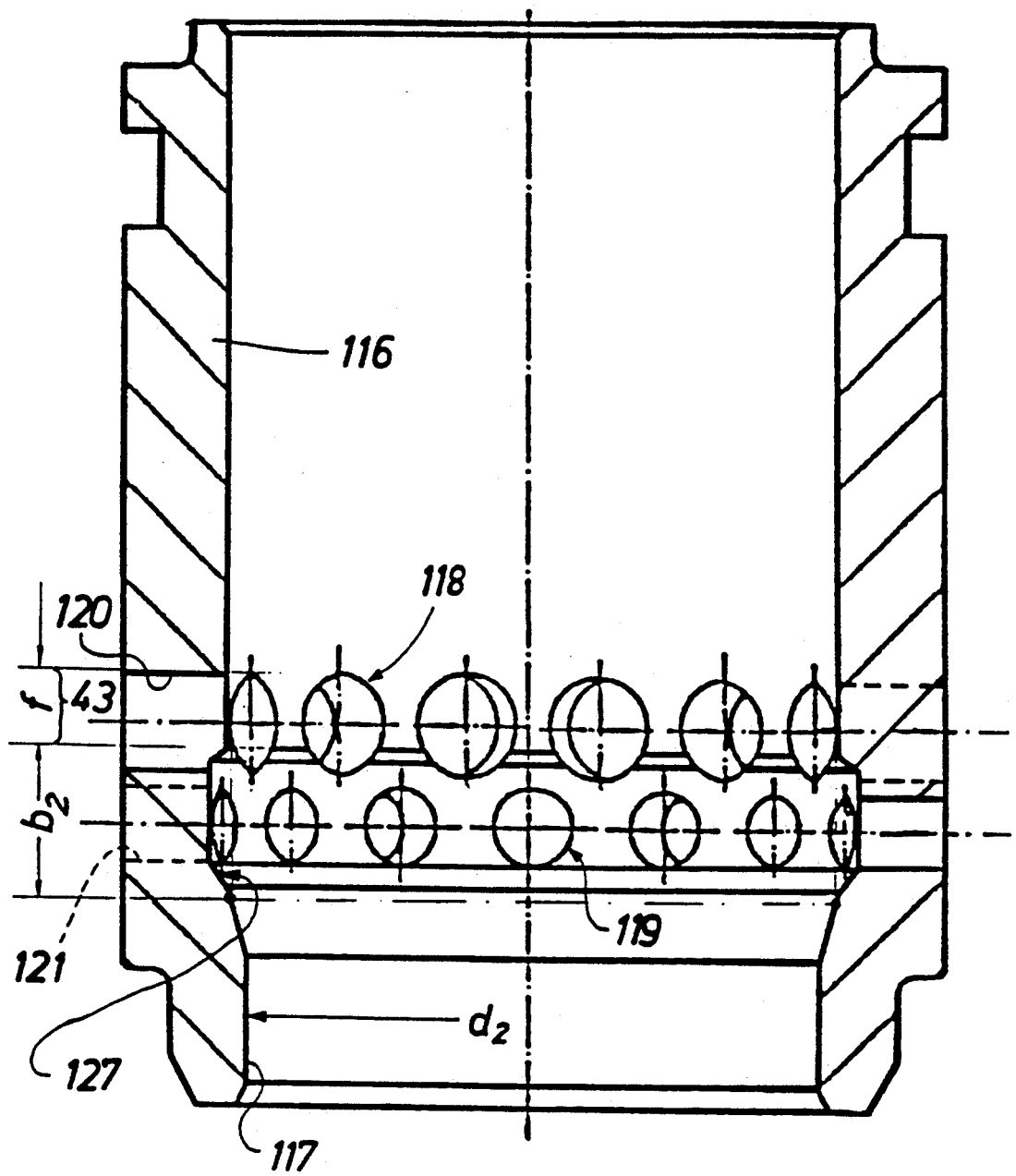

FIG. 4 discloses the control characteristics of the valve of FIG. 3;

FIG. 5 discloses schematically a first embodiment of a main valve of the invention for a pilot controlled pressure relief valve;

FIG. 6 shows the control characteristics of the valve of FIG. 5;

FIG. 7 is a schematic detail, partially in cross section, of the valve of FIG. 5;

FIG. 8 is a sectional view along line 8—8 in FIG. 7;

FIG. 9 is a detail of FIG. 7 providing more room for the numerous reference numerals;

FIG. 10 is a representation similar to FIG. 5 of a second embodiment of a main valve showing—in contrast to FIG. 5—not a poppet valve but a spool valve;

FIG. 11 is a sectional view along line 11—11 in FIG. 10;

FIG. 12 shows the same representation as FIG. 7 but including arrows to indicate the flow of pressure medium;

FIG. 13 is the same representation as FIG. 10 but showing the flow of pressure medium by means of arrows;

FIG. 14 is a known pilot controlled pressure relief valve within which the present invention is preferably realized;

FIG. 15 is a detail of the known valve of FIG. 1;

FIG. 16 shows detail of the valve of the invention as shown in FIG. 6;

FIG. 17 shows a comparison between the control characteristics of the valves of FIG. 15 and 16, respectively (similar to FIG. 2 and 6, respectively);

FIG. 18 is a comparison between the characteristics of the valves of FIG. 15 and 16, respectively;

FIG. 19 is a comparison of the characteristics of the valve designs which are shown schematically in said figure;

FIG. 20 is a sectional view of a third embodiment of a valve of the invention (without the spool);

FIG. 21 discloses a fourth embodiment of the invention;

FIG. 22 discloses a fifth embodiment of the invention;

FIG. 23 is a representation similar to FIG. 7 emphasizing an essential feature of the invention; and FIG. 24 is a sixth embodiment of the invention.

Below in connection with FIG. 1 to 4 two prior art pressure relief valves (main stage valves) will be described, and it will be explained how they can be used in a pilot control pressure relief valve of FIG. 14. Refering then to FIG. 5 as well as to FIG. 7 and 9 a first embodiment of a pressure control valve will be discussed in connection with a pressure relief valve which can preferably be used in a pilot controlled pressure relief valve as shown in FIG. 14.

Referring then to FIG. 10 and 11 a second embodiment of the invention will be described. It will be noted that the embodiment of FIG. 10 and 11 relates to a spool valve and not to a poppet valve as it is shown in FIG. 5 through 9.

Refering then to FIG. 12 through 19 the function of the pressure relief valve of the invention will be discussed. FIG. 20 to 22 show three additional embodiments of the invention disclosing another principle of the invention.

DESCRIPTION OF FIG. 1 TO 4

FIG. 1 is a sectional view of a prior art pressure relief valve 10 comprising a sleeve 11 having an inlet flow bore 12 extending symetrically with regard to the longitudinal or valve axis 13, and outlet flow bores 14 extending transversely with regard to said valve axis 13. Within said sleeve 11 a valve spool 16 is reciprocally mounted and is biased by means of spring 17 against the valve seat. FIG. 2 shows the control characteristics which can be obtained with such a valve. FIG. 3 shows another prior art pressure relief valve 20. In this example the spool 22 which is reciprocally mounted in the sleeve 11 comprises a concave spool outer surface 21. FIG. 4 shows, slightly exaggerated, the control characteristics of the valve of FIG. 3. As already mentioned in the introduction to the specification the lateral recess of the spool generates—due to the stagnation pressure in the outlet area—an additional force acting in the direction of opening. This additional force depends on the stroke (movement) and the flow volume, respectively, an effect which leads to the shown "S"-shaped characteristics.

Refering to FIG. 5 to 9 and to FIG. 12 a first embodiment of the invention will be described.

FIG. 5 through 9 disclose a first embodiment of a pressure relief valve 24 of the invention. The pressure relief valve 24 comprises a sleeve 25 within which a plurality of outlet flow bores 26 are provided extending perpendicularly with respect to the longitudinal axis 13 of the valve 24. Valve 24 further comprises an inlet flow bore 12 extending parallel to the valve axis 13. In accordance with the present invention the annular channel 19 already present for the valve of FIG. 1 is improved. In FIG. 5, 7 and 9 the annular channel is refered to by reference numeral 27, and, due to the use of said annular channel 27 the favorable control characteristics shown in FIG. 6 are obtained. FIG. 7 through 9 disclose the first embodiment of the invention on an enlarged scale and it can be recognized that the annular channel 27 has a width b2. The annular channel 27 comprises an actual ring channel 30 having a width b1 as well as a so-called annular channel section 37. The annular channel section 37 is part of a conical valve seat surface 35. The valve seat surface 35 is divided by the valve seat 36 into the already mentioned annular channel section 37 and a connecting section 38. The conical seat surface 35 merges in upstream direction into the inlet flow bore 12.

The valve spool 16 has preferably a circular cylindrical cross section.

The actual annular channel 30 comprises an annular channel starting inclination 31 having the width h, contiguous thereto an annular channel bottom surface 32 having a width b, and again adjacent thereto an annular channel end inclination 33 having a width e. Reference numeral 39 refers to a total inlet inclination, which extends between the valve seat 36 and the beginning of the annular channel bottom surface 32. In the closed condition of the valve a spool edge 40 formed by the spool 16 abuts at the valve seat 36. The width of the total inlet inclination 39 is refered to by c.

The outlet flow bores 26 have center axes 41 as well as a diameter d3. Preferably, a plurality of outlet flow bores 26 are provided, for instance six or seven prevorably, however, eight.

In accordance with the invention a zone 43 (see for instance FIG. 7) is formed which is free of the annular channel and has a width f. The zone 43 is formed between the end of the annular channel 27 located in the direction of flow, and the apex line of the outflow bore 26 furthest away in the direction of the flow of pressure medium. The distance or the width between the valve seat 36 and the center axis 41 is refered to by "a".

Moreover, between the spool edge 40 and the total inlet inclination 39 a (annular) ajustable control cross section 45 is formed. As may be gathered specifically from FIG. 8 the annular or ring channel 27 extends for its greater part in lands 47 which remain between the outlet bores 26.

The annular channel starting inclination 39 forms with respect to the valve axis 13 an angle beta, while the conical valve seat surface 35 forms an angle alpha.

In accordance with the invention the following ratios are provided:

a/d1 = 0.18 to 0.35; b/d1 = 0.16 to 0.25;
d/d1 = 0.05 to 0.15; d2/d1 = 1.05 to 1.10;
alpha = 10° to 25°
beta = alpha or beta = alpha + (7,5 to 15°)
gamma = 15° to 60°

FIG. 14 discloses the design of a pilot controlled pressure relief valve within which the invention can be used. In FIG. 14 the following reference signs having the following meaning are used:

$Q_p$—flow (of pressure medium) provided by the pump; $Q_H$—volume flow main stage; QV—volume flow pilot control stage; $P_A$—input pressure; $P_X$—pilot control stage; 1—orifice for control-volume flow (typically more resistances are connected in series); 2—orifice for dampening the movement of the main spool; 3,4 relief orifices

DESCRIPTION OF FIG. 10, 11 AND 13 SHOWING THE SECOND EMBODIMENT

While FIG. 7 through 9 disclose a so-called poppet valve, the second embodiment of the invention shown in FIG. 10, 11 and 13 discloses a spool valve 50. The difference between the second embodiment and the first embodiment resides in the fact, that in the second embodiment there is no conical valve seat surface 35, and the valve seat 36 is directly formed at the sectional point of the ring channel starting inclination 31 with the inlet flow bore 12. Thus, the same reference numerals will be used here as were used for the preceeding embodiment.

In accordance with the invention the following ratios are provided:

a/d1 = 0.18 to 0.35 b/d1 = 0.16 to 0.25
c/d1 = 0.05 to 0.15
d2/d1 = 1.05 to 1.10

Preferably at least eight bores are used and the angles are as follows:
beta = 10° to 40°
gamma = 15° to 60°

Refering now specifically the FIG. 12 through 19, the operation of the valves of the invention will be discussed.

The valves 24, 50 of the invention provide for a particularly low control deviation in the stationary range, and they further have a good stability and they are particularly usefull as main stages for pressure relief valves as well as pressure sequence valves.

The characteristics which are improved with respect to the known valves can be traced to the particular form of the trapezoidal annular channel 27, 30 located downstream behind the variable control section 45 in the guide sleeve 25 of the main spool 16. Said trapezoidal annular channel which is interupted by eight outlet flow bores 26 is limited in down flow direction outwardly by the lands between the outlet flow bores 26 located in the extension of the conical valve seat, and the annular channel 30 is limited in flow direction upwardly inwardly by the cylindrical outer surface of the main spool.

The geometric dimensions are characterized by the above given ratios. When taking said ratios into consideration similarly good results can be achieved for valves having different spool diameters.

To be able to explain the influence of the annular channel onto the control behaviour of the valve 24, 50 initially the reasons for the control deviation will be analyzed.

With pilot controlled pressure relief valves an increase of the adjusted pressure occurs generally with an (increase) of the volume flow. This pressure increase is, related to the range of change of the volumn flow, the control deviation of the valve in the stationary condition of operation. For the control deviation, there are two causes:

The movement of the main spool increases with the volume flow; and the flow force.

With increasing movement (stroke) the force of the main spool spring 17 increases. The biasing force and stiffness are designed to be low inasmuch as the main spool 16 is controlled and "biased", respectively, by means of a pressurized oil volume. The high flow speed in the variable control cross section 45 causes—for high adjusted pressures and large changes of the volume flow—only small stroke variations. Thus, the increase of the spring force with the spool movement is very small. Nevertheless, said increase of the spring force can cause a not negligable increase of the control deviation of the entire valve due to the amplification by the effective chain of the control-volume flow-control deviation of the pilot pressure relief valve. The change of the spring force influences the control deviation directly and indirectly: directly by changing the spring force itself and indirectily by increasing the control-volume flow.

The force of the main spool spring 17, as related to the spool surface subjected to pressure, determines (see FIG. 14) the pressure drop at the fixed orifice 1 (dampening network) and thus the control volume flow. An increase of the control volume has as a consequence the increase of the control pressure (control deviation of the pilot pressure relief valve 5), and this again causes an increase of the input pressure at the main port of the valve 24.

Based on the low spring constant of the main spool spring 17 as well as based on the small control movements of the main spool 16, the influence of the main spool sping 17 onto the increase of pressure for an increasing spool stroke is small with regard to influences of the flow.

An effective reduction of the pressure increase with the volume flow can only be obtained by influencing the flow force.

Thus to be able to pass the narrowest throttle cross section, the liquid jet has to be strongly accelerated. For this purpose, potential energy of the static pressure is transfered into kinetics accelerating energy. The pressure loss occuring therewith is equivalent to the flow force.

In case that the main stage of a pilot control pressure relief valve is subjected to a constant control pressure (for instance by supplying the control volume flow via a mass controller to the pilot controlled pressure relief valve) an increase of the adjusted pressure $P_{desired}$ is measured for an increasing volume flow across the main stage.

The flow force acts thereby onto the spool 16 in closing direction, and this is the main cause for the increase of the pressure with volume flow.

With the geometry of the outlet flow of FIG. 7, the jet exiting the variable control cross section 45 with high speed will be heavily delayed when entering the gap (inner outlet flow ring channel) which is formed by the lands between the outlet bores 26 of the sleeve 25 and the outer surface of the spool 16, and a part of its kinetic acceleration energy will be retransformed into potential pressure energy. The thus created pressure increase is proportional to the volume flow and occurs in downflow direction behind the variable control cross section and compensates to a large part the pressure loss in flow direction upwardly in the inflow area close to the variable control section 45, a pressure loss which is responsible for the flow force. Expressed differently the following holds true: based on the increased pressure in the gap between spool 16 and bore lands 47 (see for instance FIG. 11) the integral pressure differential at the control cross section is smaller. Thus, the spool 16 will carry out a larger opening movement, or, a large increase of the control cross section area corresponds to the same increase of volume flow compared with the case of an annular channel of the traditional design having a lower stagnation pressure in said annular outlet flow gap. In this way, the increase of the input pressure with the volume flow is drastically reduced.

FIG. 15 through 18 compare the characteristics of the pressure over the volume flow and of the control volume flow over the flow throughput, with the pressure being a parameter, for a main stage of the traditional design (FIG. 15) and a main stage of the new seat geometry (FIG. 16).

The reduction of the axial component of the flow force is obvious for the main stage valve 24 of the invention. The small increase of the controlled deviation with the pressure level is striking; correspondingly low is also the range of change of the amount of control oil with the volume flow and the adjusted pressure. As it was already mentioned, the best results are achieved with sleeves 24 having eight outlet flow bores 26 arranged in a plane perpendicular to the valve axis 13, and with the dimensions of the annular channel arranged within the above mentioned limitations.

FIG. 19 discloses for three cases A, B and C the flow force. For A and B the resistance of the inner annular channel is neglegibly small. In FIG. 19c reference numeral 9 refers to the inner outflow channel. The measurements relating the change of the flow force with the spool movement basically have the same outline (FIG. 19). Initially, the flow force strongly increases with the spool stroke or movement and with the volume flow, and beginning with the maximum of the flow force the volume flow remains constant and the flow force decreases from there hyperbolically with the spool movement. With the geometry of the seat in accordance with the invention it was possible to drastically reduce said maximum (FIG. 19 dashed characteristic) and, as a consequence, the good stability and the low tendency to vibrate are obtained. The effect of the flow force onto the control deviation of the valve is—similar to the force of the main spool spring—increased by the control deviation of the pilot control, i.e. an increase of the flow force causes an increase of the pressure drop at the orifice for the control volume flow which increases and causes an increase of the control pressure and thus of the input pressure.

The geometry provided by the invention in the outlet flow area of the valve sleeve effectively compensates for the axial component of the flow force. Thus, the control deviation remains very low over the entire range of volumes for the respective nominal size and at the same time good stability is achieved.

FIG. 20 is a sectional view of a third embodiment of the invention with only the valve sleeve 16 being shown in cross section while the spool has been deleted. Here again, a single inlet flow bore 12 is provided together with a plurality of outlet flow bores 26 having a diameter d3 and being arranged in a plane perpendicular to the longitudinal valve axis 13; said outlet flow bores 26 are radially spaced. Even though this embodiment is a poppet valve, only a single annular channel starting inclination 61 is provided similar to the embodiment shown in FIG. 10; said inclination 61 is identical with the conical valve seat surface and forms the valve seat 63. The annular channel is refered to by reference numeral 64 and has a width of b2. It can be recognized that a zone 43 having the width f remains which is free of the annular channel. In this manner a prefered operation of the valve is achieved, even though in the present case b2 :s approximately equal to d3. The angle beta is preferably 30°.

FIG. 21 discloses a fourth embodiment of the invention. This embodiment is a modification of the embodiment of FIG. 20 in—sofar as here again, separately, a conical valve seat surface 65 with a valve seat 66 is provided, and contiguous therewith an annular channel starting inclinations 67 is provided. The width b2 of the annular channel 69 is here larger than the diameter d3 of the outlet flow bores 26. Nevertheless, an advantageous operation of the valve is achieved. The zone free of the annular channel is again refered to by reference numeral 43 and has a width f.

FIG. 22 discloses finally a fifth embodiment of the invention providing for an annular channel 71 having a width b2 which is substantially larger, about 50%, than the diameter d3 of the outlet flow bores 73. Here like for the embodiment of FIG. 21 an annular channel free zone 43 having a width f is provided. Moreover, outlet flow bores 73 and 74 having differently large outer diameters are alternately provided.

A feature of the present invention is the stepless transition in the control area of the control spool from the inlet bore to the annular channel. By this feature a substantial improvement of the control operation of the pressure valve is obtained. FIG. 23, which has been derived from FIG. 7, is used to explain this feature. The step shown in FIG. 7 results in praxi due to the grinding operation (during manufacture). It should be noted, however, that the diameter d2 is larger than the diameter of the inlet flow bore 12. In the control range of the control edge 40 between the inlet flow bore 12 and the annular channel 27 a stepless transition area or range 31, 35 is provided.

Further, the transition range 31, 35 consists of two conical partial areas which form at the same time a limiting wall of the annular channel 27; the partial area 35 contiguous to the inlet flow opening 12 extends under an angle alpha between 10° and 25° and the second partial area 31 extends under an angle beta which corresponds to the angle alpha or to an angle alpha +7,5° to 15°.

The transition area 35 adjacent to the inlet flow opening 12 forms the seat surface 36 for the control or spool edge 40 and is correspondingly round. It is prefered that the longitudinal extension of said two partial areas 31, 37 is approximately equal. It should be noted that the zone (width f) of the outlet flow bores 26 which is free of the annular channel comprises preferably at least 30% of the diameter d3 of the outlet bores 26.

Preferably, the width $b_2$ of the annular channel 27 is smaller than the diameter d3 of the outlet flow bores 26. Preferably at least six outlet flow bores are provided but eight outlet flow bores are prefered. The bordering wall 33 of the annular channel 27 distant from the inlet flow bore 12 extends preferably in the area of the outlet flow bores 26. In this respect see specifically FIG. 22.

Regarding the embodiment of FIG. 21 and 22 it is noted that the annular channel width $b_2$ is larger than the diameter d3 of the outlet flow bores 73. Said dimensions are prefered. A good dependency on the pressure volume together with a stable control behaviour is preferably achieved when the following conditions are met:

the width of the annular channel 27 divided by the diameter $d_1$ of the inlet flow bore or spool bore 12 is 1 : 4. At least six outlet flow bores 26 are provided. The diameter $d_2/d_1$ form a ratio of 1,05 to 1,15. In addition the angles alpha are 10° to 25°, beta=alpha or beta=alpha+(7,5° to 15°) and gamma=15° to 60°.

FIG. 24 discloses a sixth embodiment of the invention according to which, in contrast to the preceeding embodiments, the outlet flow openings are arranged in two rows. This results in an improved noise behaviour.

In detail the following is shown: In a sleeve 116 an inlet flow bore 117 having a diameter d2 is provided together with two rows 118, 119 of outlet flow bores 120 and 121, respectively. Preferably, said bores in said two rows 118 or 119 are offset with regard to each other (as it is shown). Moreover, said bores 120 and 121, respectively, have different diameters. The annular channel 127 has a width $b_2$ such that a zone 43 free of the annular channel is provided having a width f. The above general explanations are also true for this embodiment in an appropriate manner. The outlet flow bores 120, 121 can be arranged on a plurality of planes about the circumference. Preferably on each plane more than eight outlet flow bores are arranged. In accordance with a preferred embodiment, the outlet bores located in the row facing towards this seat surface have a diameter which is smaller than the width b₂ of the annular channel and they are arranged in its area, wherein the outlet bores 120 in the row 118 facing away from the seat surface are partially in the upper area of the annular channel and partially in the area of the zone 43 which is free of the annular channel. It is further preferred that the outlet flow bores 120 located away from the seat surface have a larger diameter than the outlet flow bores 127 facing towards the seat surface.

In short, the present invention provides for a pressure valve having an inlet bore, an annular channel and a control spool with an annular channel being provided to obtain a low control deviation and good stability, said annular channel being located on the downflow side and having an axial extension which is smaller than the outflow area formed by said bores. Preferably, the outlet flow bores extend vertically with respect to the longitudinal axis of the valve. Moreover, the valve spool preferably has a circular cylindrical cross section without a concave outer surface like it is shown in FIG. 3.

We claim:

1. A pressure control valve comprising:
   a sleeve (25),
   an inlet flow bore (12), axially extending in said sleeve,
   a plurality of outlet flow bores (26) radially extending in said sleeve,
   a spool (16) having a constant outer diameter, axially reciprocally mounted in said sleeve (25), acting as a control element, said spool having a spool edge (40) adapted to be moved through a control range,
   an annular channel (27) provided in said sleeve (25) between said inlet flow bore (12) and said outlet flow bores (26), said annular channel (27) having a width (b2) and a diameter (d2), said diameter (d2) being larger than the diameter of said inlet flow bore,
   a stepless transition area provided in said control range within said sleeve between the inlet flow bore (12) and a starting inclination (31) of the annular channel, said outlet flow bores form top ends and, opposite thereto, bottom ends and are arranged across a part of said annular channel such that a zone (43) remains which is free of the annular channel, and wherein the bottom ends are located in the area of said starting inclination (31).

2. The valve of claim 1 characterized in that the zone (43) which is free of the annular channel is located between one third and one fifth of the diameter (d3) of said outlet flow bores (26).

3. The valve of claim 1 or 2 characterized in that the zone (43) of said outlet flow bores (26) which is free of said annular channel comprises at least 30% of the diameter (d3) of said outlet flow bores (26).

4. The valve of claim 1 characterized in that the width (b2) of the annular channel (27) is smaller than the diameter (d3) of the outlet flow bores (26) and at least six outlet flow bores are provided, and the bordering wall (33) of the annular channel (27) which does not face toward the inlet flow opening (12) is located in the area of the outlet flow bores (26).

5. The valve of claim 1 characterized in that the outlet flow bores (120, 121) are located on a plurality of planes at the circumference.

6. The valve of claim 5 characterized in that on each plane more than eight outlet flow bores are arranged (FIG. 24).

7. The valve of claims 5 or 6 characterized in that the row of outlet flow bores facing towards the seat surface comprises a diameter which is smaller than the width (b2) of the annular channel (127) and said bores are located in its area, and wherein the row of outlet flow bores facing away from the seat surface are partially located in the upper area of the annular ring channel and partially in the area of the zone (43) which is free of the annular channel.

8. The valve of claim 7 characterized in that the outlet flow bores facing away from the seat surface have a larger diameter than the outlet flow bores facing towards the seat surface.

9. The valve of claim 1 characterized in that the distance (a) of the valve seat (36) with respect to the center axes (41) of the output flow bores (26) is in the area of 0.18 to 0.35 of the diameter of the inlet flow bore.

10. The valve of claim 1 characterized in that the diameters d2/d1 have a ratio of 1.05 to 1.15, wherein d2 is the outer diameter and d1 is the inner diameter of the annular channel.

11. The valve of claim 1 characterized in that for the width (b) of the bottom surface (32) of the ring channel and the diameter (d1) of the longitudinal bores (12) the following holds true: b/d1=0.16 ... 0.25.

12. The valve of claim 1 characterized in that the distance (c) between the valve seat (36) and—seen in the direction of flow—the beginning of the bottom surface (32) of the annular channel the following holds true: c/d1=0.5 ... 0.15, wherein d1 is the diameter of the inlet flow bore.

13. The valve of claim 1 characterized in that a transition area between the annular channel and the inlet flow bore comprises two conical partial areas which simultaneously form a bordering wall of the annular channel (27), where in the partial area (35) contiguous to the inlet flow opening (12) extends under an angle alpha of between 10° and 25° and the second partial area (31) extends under an angle beta which corresponds to the angle alpha+7.5 to 15°.

14. The valve of claim 13 characterized in that the longitudinal extension of the two partial areas (31, 37) is approximately equal.

15. The valve of claim 1 characterized in that the transitional area (35) contiguous to the inlet flow opening (12) forms the seat surface (36) for the spool edge (40), said transitional are being formed by a grinding operation.

16. The valve of claim 1 characterized in that one end of the annular channel is formed by an annular channel end inclination (33) which is between 15° and 60°.

17. A pressure control valve comprising:
   a sleeve (25),
   an axially extending inlet flow bore (12) as well as a plurality of radially extending outlet flow bores (26) provided in said sleeve, and
   a spool (16) having a constant outer diameter and mounted in an axially movable manner in said sleeve (25) and acting as a control element and comprising a spool edge (40) adapted to be moved through a control range,
   an annular channel having a width (b2) being provided in said sleeve (25) between said inlet flow bore (12) and said outlet flow bores (26) wherein the width (b2) of the annular channel (27) is smaller than the diameter (d3) of said outlet flow bores (26), an annular channel starting inclination (31) being formed by said annular channel, and a conical valve seat surface defining a stepless transition area provided in said control range within said sleeve between the inlet flow bore (12) and the starting inclination (31), the outlet flow bores forming top ends and, opposite thereto, bottom ends and being arranged across a part of said annular channel such that a zone (43) remains which is free of the annular channel, and wherein the bottom ends are located in the area of said starting inclination (31).

18. The valve of claim 17 characterized in that a plurality of eight outlet flow bores (26) is provided.

19. A valve of claim 17 characterized in that the conical valve seat surface adjacent the inlet flow opening (12) extends under an angle alpha.

20. The valve of claim 19 characterized in that an angle beta formed by the annular channel starting inclination (31) is equal to the angle alpha+formed by said valve seat surface.

21. The valve of claim 17 characterized in that one end of the annular channel is formed by an annular channel end inclination which is between 15° and 60°.

22. The valve of claim 17, characterized in that the annular channel (27) has a diameter (d2), said diameter (d2) being larger than the diameter of said inlet flow bore.

* * * * *